April 28, 1931.  L. A. HAZELTINE  1,803,184
METHOD AND APPARATUS FOR CONVERTING ELECTRIC POWER
Original Filed July 5, 1923
*Fig. 1a,*
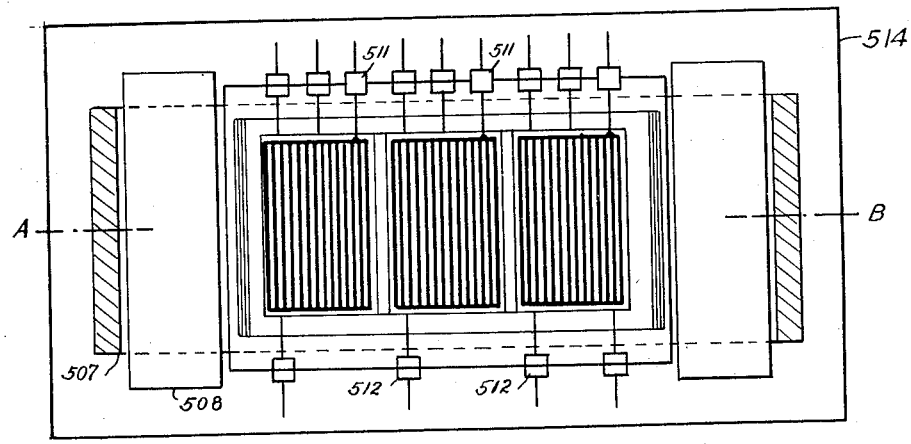
*Fig. 1b,*
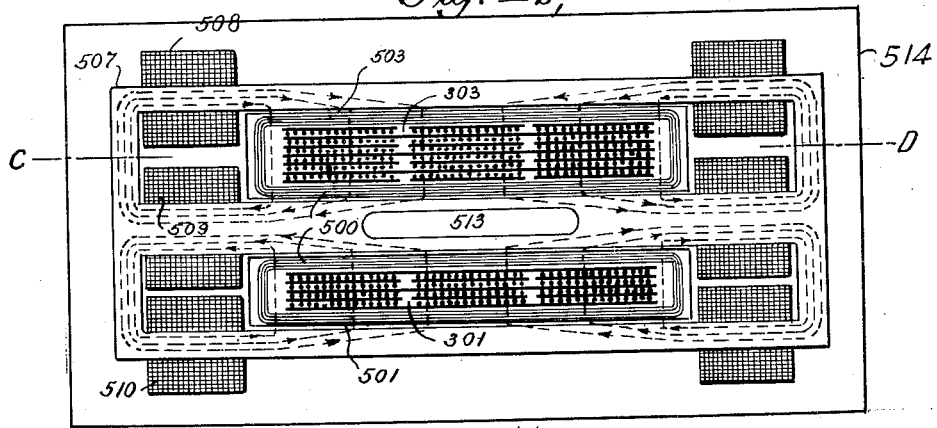
*Fig. 2.*
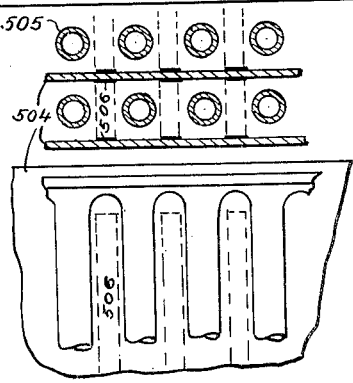
INVENTOR
Louis A. Hazeltine
BY
Pennie, Davis, Marvin and Edmonds.
ATTORNEYS Patented Apr. 28, 1931

1,803,184

UNITED STATES PATENT OFFICE

LOUIS A. HAZELTINE, OF HOBOKEN, NEW JERSEY, ASSIGNOR TO GENERAL ELECTRIC COMPANY, A CORPORATION OF NEW YORK

METHOD AND APPARATUS FOR CONVERTING ELECTRIC POWER

Original application filed July 5, 1923, Serial No. 649,536, and in Great Britain July 4, 1924. Divided and this application filed January 20, 1927, Serial No. 162,238. Renewed September 18, 1930.

This invention relates to an electric valve converter arranged for high efficiency. The various forms of circuit in which such a valve converter may be employed to make its possible high efficiency fully effective are discussed in my patent application Serial No. 649,536, filed July 5, 1923, of which this is a division.

In the converter forming part of this invention each valve is of the magnetically guided, electrostatically controlled, thermionic type, in which (when the valve is closed, i. e., when its resistance is relatively low) the electrons are accelerated from the cathode by a highly positive control electrode (in the form of a grid) and are constrained to move along lines of magnetic flux so that they pass between the rods of the grid without reaching them, and then, being attracted by the control electrode, retard to a low velocity before reaching the anode. (Usually the main electrodes are each alternately anode and cathode and are therefore both maintained electron-emissive, as by heating.) In this way the voltage drop in the valve circuit is kept very low, and the grid current practically negligible, although the grid potential may be very high. Another feature of this valve is the enclosing of the electrodes within concentric metal shells which reflect back to the electrodes the heat developed by the losses, the design being such that this heat maintains the emission from the main electrodes. Such conserving of the heat is made especially desirable in magnetically guided valves on account of their low losses.

The accompanying drawings illustrate a preferred form of the invention, but the fundamental principles disclosed may be embodied in various ways.

Referring to these drawings,

Figs. 1a and 1b show, respectively, an elevation and a plan in section of a preferred form of electric valve converter adapted specifically to convert direct-current power in two steps into low-frequency alternating-current power.

Fig. 2 is a detail in plan and elevation of the valve structure of Figs. 1a and 1b.

In the use of this invention for converting electric power to or from direct current or low-frequency alternating current, it is preferred to carry out the conversion in two steps, the first step converting the input power to a moderately high frequency (of the order, for example, of a few hundred or a few thousand cycles per second), and the second step converting this high-frequency power to the desired output form. Thus there are shown in Figs. 1a and 1b two valve systems, a direct-current valve system 301 for converting direct-current into high-frequency power, and an alternating-current valve system 303 for converting the high-frequency into the desired low-frequency power. Each valve system consists of a metal vessel 501 and 503 in which a very high vacuum is maintained, preferably by a continuously operating high-vacuum pump. Inside of these vessels are reflectors consisting of concentric metal shells 500, preferably polished, for the purpose of retaining the heat developed by the losses in the valves and so maintaining the main electrodes 504 at the proper temperature for electron emission. Within the reflectors are the valves proper, a detail of which is shown in Fig. 2. This Fig. 2 shows one complete valve and a portion of another, each valve comprising only one grid and two plates. In Fig. 1b there are shown two valve systems, one in the top half of the figure and the other in the bottom half of the figure. Each of these valve systems consists of three groups of valves and each of the groups comprises a plurality of valves. In the top half of Fig. 1b the number of valves in each group is six, one above the other, and in the bottom half of Fig. 1b the number of valves in each group is four, one above the other. The main electrodes are flat metal plates, while the control electrodes are grids made up of metal tubes 505. The main electrodes are given an emissive coating, such as calcium oxide, over the portions 506 in the central space between grid conductors. Both of the main electrodes are thus made emissive so that current can flow in either direction. The valve systems are placed in a constant magnetic field produced by the iron core 507 excited by the coils 508, 509, 510, the lines of magnetic flux having the paths indicated by the dotted lines. The coils are excited by direct current and produce an intense magnetic field in the space occupied by the valve systems, say a magnetic intensity of the order of 1,000 ampere-turns per centimeter. During a portion of each control cycle, the grid of each valve is made highly positive in potential (say 10,000 volts) with respect to the two main electrodes. Electrons then are attracted from the cathode and are rapidly accelerated to high velocity. They are guided by the magnetic field, tending to move along the lines of magnetic flux, but with a rotary component of motion and a drift parallel to the grid conductors. With the intense magnetic field their rotary motion does not carry them far enough out of the direct path to reach the grid conductors. They therefore continue their motion after they pass the neighborhood of the grid conductors; now, however, the attraction of the grid conductors is in such a direction as to retard the electrons, which slow down until they strike the anode with a low velocity corresponding say to a voltage of the order of 10 volts, which is then the voltage drop of the valve. The space distribution of electrons is determined by the potential of the grid; while the net rate at which electrons proceed from the cathode to the anode is determined by the load on the valve. It is necessary that the load on the valve shall never be so high that all of the electrons are traveling toward the anode, for any increase in load could not then be supplied by increased current, and would cause the load voltage to drop off, the valve being required to absorb the difference in voltage and thereby being overheated. Thus some of the electrons which happen to have slightly lower longitudinal velocities will not quite reach the anode and will return toward the cathode, oscillating back and forth throughout the interval when the valve is closed. The two oppositely moving streams of electrons will experience certain collisions with one another and with residual molecules of gas. The collisions between electrons will not be serious if the duration of the current is short—that is, if the control frequency is moderately high, say of the order of 1,000 cycles per second. The presence of gas molecules is minimized by the use of the highest possible vacuum.

The valve is opened by making the grid highly negative in potential (say a few thousand volts) with respect to both main electrodes. The electrons are then very quickly drawn to the main electrodes, including those electrons which have suffered collision and which therefore have lost so much longitudinal velocity that they were unable to reach either main electrode during the interval when the valve was closed.

It is essential that the grid conductors and the main electrodes opposite the grid conductors should have a surface, say of uncoated tungsten, which gives relatively very little electron emission at the operating temperature.

The temperature of the electrodes is largely self-regulating, and is that which maintains the electron current near its saturation value. For if the load should increase, the voltage drop in the valve would temporarily increase, as described above, which would accelerate the electrons and heat up the anodes, which in turn would reflect the heat to the cathodes. This action would continue until the cathodes again reached the temperature required for the new emission.

As the valve system described has low inherent losses, it is preferable to conserve the heat by limiting its radiation, by the use of reflectors as described above, and by limiting its conduction through the leads, which therefore are made long enough and of small enough cross-section so that the heat conducted through them at the seals is approximately equal to the heat developed in their resistances.

The grid leads are shown as brought out through seals 511 at the top of the valve structures, and the leads of the main electrodes at the bottom, for convenience. The whole structure of Figs. 1a and 1b is preferably immersed in a tank 514 filled with oil which serves to insulate the leads and whose circulation conducts the heat away and keeps the coils at a suitably low temperature. A ventilating hole 513 is shown in the center of the iron core to facilitate the upward flow of the oil. To start the operation of the valve converter it is necessary to supply heat from a separate source. This is preferably done by passing current through a resistor inside each valve system, the inside heat reflector being available for this purpose. Otherwise an alternating current may be passed through the coils 508 and will produce an alternating magnetic flux which will induce eddy currents in the electrodes and will so heat them. If this latter method is adopted, it will of course be preferable to laminate the iron core 507.

The object of placing in a single container the various grids which control the passage of current through the tube and the main electrodes which are associated with these grids is of course to reduce the space and expense required by the prior art practice of providing a separate container for each grid and its associated electrodes in devices employing a plurality of grid controlled space discharges. There is not only the lower cost of making one large container instead of a plurality of small containers. The use of a single container for many grids and their associated electrodes permits the same electrode to serve as the cathode for one grid and as the anode for another grid and thereby reduces the total number of electrodes which are required. It is of course obvious that these results may be dispensed with and that each grid may be provided with its own two main electrodes and that each grid and its two main electrodes may be enclosed in a separate container as customary in prior art apparatus.

The reason for relying upon the mirrors 500 in the tube construction illustrated to secure the temperature which is required for the necessary emission of electrons from the cathodes is of course to avoid the many additional conductors and more complicated cathode structure which characterize the separate cathode heating currents used in prior art devices. It is of course obvious that this special heating means need not be used and that each main electrode may be provided with the ordinary separate heating current used to heat the cathodes in the ordinary tubes of the prior art. The use of the usual separate heating current is of course especially applicable when the prior art practice of enclosing each grid and its immediately associated main electrodes in a separate tube is followed.

The purpose of making emissive both of the main electrodes pertaining to each grid is so that current can flow in either direction. If current is only to pass in one direction between each anode and cathode, it will of course be sufficient to provide the emissive material only on that side of the main electrode which is to act as a cathode. If the prior art practice of enclosing each grid and its associated electrodes in a separate container and of securing the necessary emission temperature by separate heating currents is to be followed, and one way operation only is desired, the separate heating currents would of course, as customary in the art, be applied only to that one of the main electrodes which serves as the cathode.

As has been stated hereinabove, the positive voltage applied to the grids may be as high for example as 10,000 volts above the potential of the main electrodes, and this very high grid voltage in conjunction with the powerful magnetic field and the special arrangement of the electrode emitting surface with respect to the grid bars, will reduce the voltage drop or anode voltage between each pair of main electrodes to a very small value such for example as 10 volts. As is well understood in the art there is a waste of energy at every anode which is proportional to the anode voltage. So that this proposed reduction in the anode voltage to 10 volts instead of the much higher voltages customarily used in the tubes of the prior art, will effect a very important saving. But a less powerful magnetic field may of course be used and the positive voltage used on the grids correspondingly diminished with a resulting larger anode voltage and larger loss of energy at the anodes, other things being the same.

If in any particular embodiment of the invention the grids become emissive, as would be manifested by currents in the grid lead when the grid voltage is negative, any difficulty in this regard can be overcome, as those skilled in the art fully understand, by maintaining a sufficient difference in temperature between the grids and the cathodes.

It will of course be apparent to those skilled in the art that the invention disclosed and claimed herein may be applied to other purposes than conversion and to direct current work as well as to alternating current work, and that the invention in its broader aspect is not limited to the use of a plurality of grids with their associated anodes and cathodes.

I claim:

1. An electrostatically controlled valve which comprises two main electrodes having electron-emissive surfaces, means for sustaining a magnetic field whose lines of magnetic flux extend from the emissive surface of one electrode to the emissive surface of the other electrode, whereby electrons are magnetically guided in their motion between the main electrodes, and a control electrode in close proximity to the main electrodes but outside of the electron paths.

2. An electrostatically controlled valve comprising parallel anode and cathode, a control electrode between them having the form of a grid, means for sustaining a magnetic field perpendicular to the anode and cathode, and an electron-emissive surface on the cathode opposite only the space between the conductors of the grid.

3. An electrical converter comprising a plurality of electrostatically controlled valves as claimed in claim 1, all of said valves being placed in the same magnetic field.

4. An electrostatically controlled valve converter comprising an iron core designed to be magnetized by direct current and having a space between its poles, an evacuated vessel placed in said space, main electrodes having electron emissive surfaces and mounted perpendicular to the magnetic flux in said vessel, and control electrodes in close proximity to the main electrodes but outside of the electron paths.

In testimony whereof I affix my signature.

LOUIS A. HAZELTINE.